Sept. 4, 1956

C. H. BEARE 2,761,202

METHOD OF MAKING AN ELASTOMERIC BUSHING

Filed April 7, 1953

INVENTOR.
Charles H. Beare
BY
Attorney

Sept. 4, 1956     C. H. BEARE     2,761,202
METHOD OF MAKING AN ELASTOMERIC BUSHING
Filed April 7, 1953     2 Sheets-Sheet 2
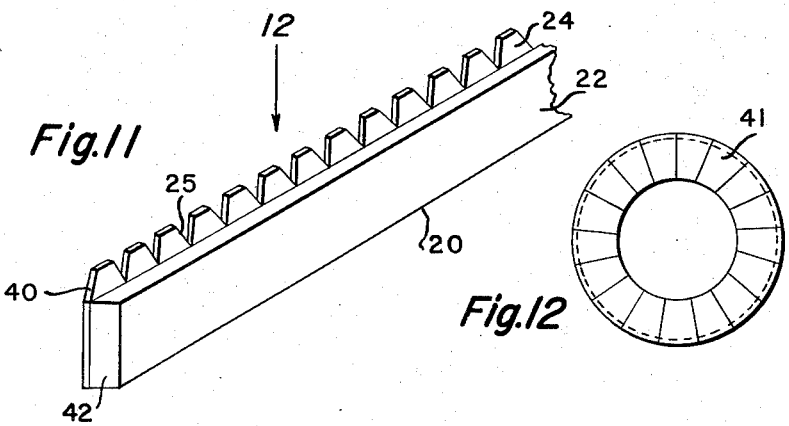
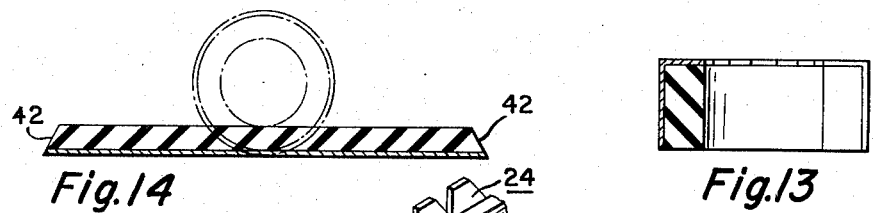
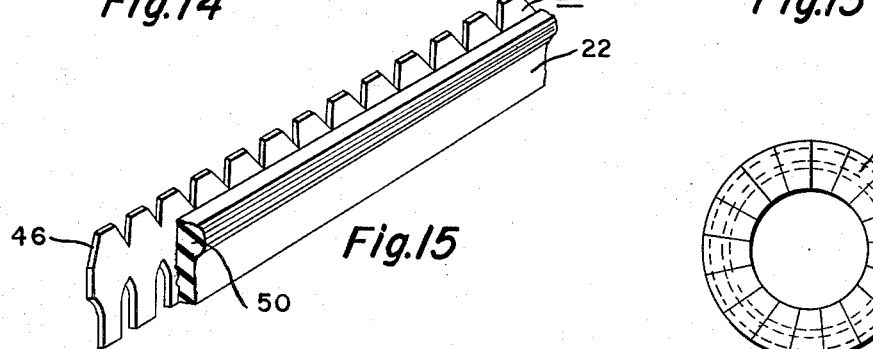
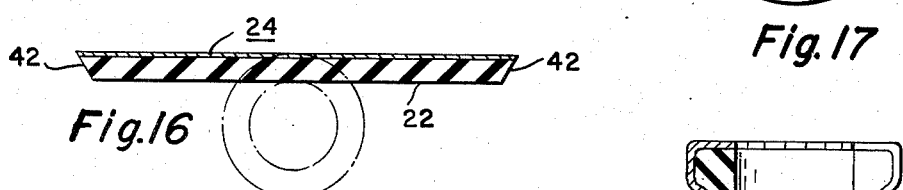
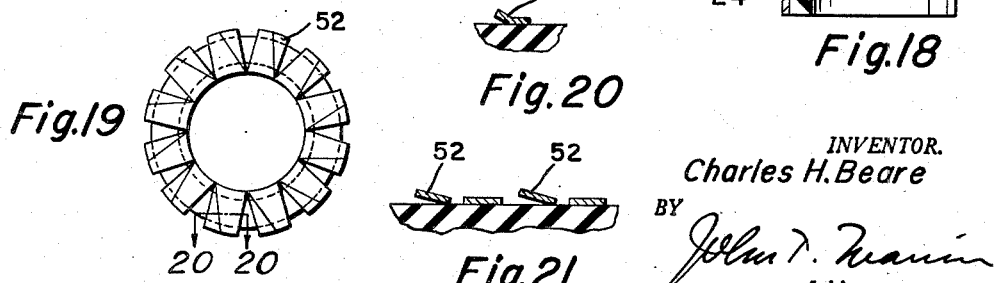
INVENTOR.
Charles H. Beare
BY
Attorney United States Patent Office 2,761,202
Patented Sept. 4, 1956

2,761,202

METHOD OF MAKING AN ELASTOMERIC BUSHING

Charles H. Beare, Dayton, Ohio, assignor to General Motors Corporation, Detroit, Mich., a corporation of Delaware Application April 7, 1953, Serial No. 347,286

9 Claims. (Cl. 29—417)

This invention relates to a method for forming reinforced annular elastomeric articles and more particularly to a method for forming reinforced elastomeric bushings or seals.

Heretofore it has been the practice, when forming annular elastomeric articles having attached metallic reinforcing portions, to form these articles, such as bushings, seals, etc., within a mold by a pressure molding process. This process, while satisfactory for the formation of these parts, is time consuming and requires large and expensive pieces of equipment which serve merely as pressure applying means and otherwise are idle while the process is carried to a conclusion. The curing times for satisfactory vulcanization of elastomeric materials vary, but it has been found that satisfactory cures, depending upon the temperatures and types of materials being cured, will require twenty minutes or longer. Thus the productive capacity of a single press is decidedly limited to a few pieces each day, a fact which has been reflected directly in the costs of elastomeric articles formed by this method.

An extrusion process, in contrast to pressure molding process when used for the formation of elastomeric articles, is generally conceded to be far more economical. This process permits the continuous formation of compounded unvulcanized elastomeric material in strip form having the desired cross sectional shape. The formed strip is then carried to a retort capable of accommodating large quantities of the uncured material wherein a suitable temperature and curing atmosphere is maintained for effecting the vulcanization of the elastomer.

It is therefore, an object of the present invention to reduce the cost of production of a reinforced elastomeric article. This object is accomplished by providing a length of metallic material having a length of elastomeric strip attached thereto, dividing the metallic strip and attached elastomeric strip into sections of predetermined length, rolling each of said sections into an annulus and thereby forming an annular elastomeric bushing or seal having a reenforced backing attached thereto.

It is another object of the invention to form a split, annular reinforced elastomeric article by a method which comprises: extruding a length of uncured elastomeric material having a predetermined width and cross-sectional shape, curing said material so as to maintain the cross-section shape formed while simultaneously bonding it in situ to a metallic backing and thereby forming a composite strip, dividing said composite strip into sections of predetermined length, and finally rolling each of said sections so the ends thereof are in juxtaposition and thereby forming a plurality of divided annular articles.

In carrying out the above objects it is another object of the present invention to deform an edge portion of the metallic backing member for forming a metallic flange on the annular reinforced elastomeric article.

It is a further object, in carrying out the above objects, to form angularly disposed faces on the end portions of the divided sections of the reinforced elastomeric strip, whereby the divided annulus, when formed by the rolling of the section, will have the end faces thereof in juxtaposition.

Further objects and advantages of the present invention will be apparent from the following description, reference being had to the accompanying drawings, wherein a preferred embodiment of the present invention is clearly shown.

Figure 5:
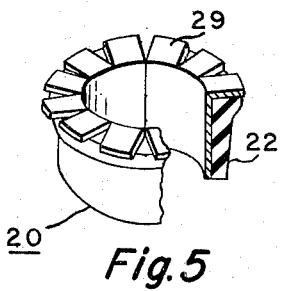
Figure 7:
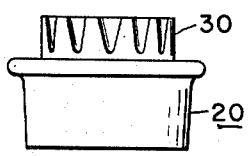
Figure 6:
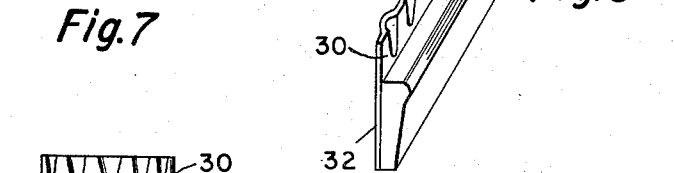
Figure 9:
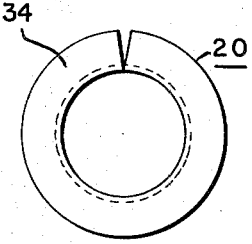
Figures 8, 10:
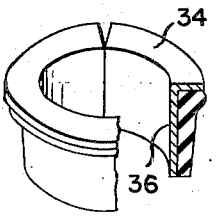

Figure 5 diagrammatically and in section shows a view of the composite bushing.

Figures 6 to 10 are views corresponding to the views shown in Figures 1 to 5 and illustrate one modification of the present invention wherein the formation of a corrugated edge on the metallic backing strip, will result in a continuous annular flange on the composite bushing as seen in Fig. 5.

Figures 11 to 14 illustrate another modification of the present invention wherein the edges of the metallic strip when notched, and the ends of the composite strip when angularly cut as seen in Figure 11 will result in split annular continuous flange portion and a split annular continuous elastomeric portion as seen in plan view in Figure 12 and in section in Figure 13 when the composite strip is rolled as seen in Figure 14 to form the bushing with an outer metallic annulus.

Figures 15 to 18 represent a further embodiment of the present invention wherein the strip in Figure 15 has a notched edge on the metallic element and a predetermined cross-sectional shape of the elastomeric member. These elements form a split continuous flange portion of the metallic element as seen in Fig. 17 of the metallic element and a straight surface on the internal cylindrical portion of the elastomeric member as seen in Figure 18 when the angled ends of the strip are brought together as shown diagrammatically in Fig. 16 and the outer metallic member is inwardly deformed.

Figure 19 diagrammatically shows a further modification of the present invention in plan view wherein portions of the notched flange portion of the metallic strip (as in Fig. 1) have been turned outwardly so as to form bent tangs on the flange as seen in an enlarged view in Fig. 20.

Figure 21 diagrammatically in section shows a bushing formed according to Figures 1 to 5 wherein alternate notches are partially bent, thereby forming alternate locking tangs on the flange portion of the bushing.

In the drawings and particularly in Figures 1 to 5, numeral 20 designates one form of a reinforced elastomeric bushing formed according to the present invention. The elastomeric reinforced article 20 includes an elastomeric portion 22 suitably attached to a metallic reinforced member 24. In this embodiment, the length of elastomeric strip 22, preferably formed by an extrusion process, has a predetermined cross-sectional shape. The metallic reinforcing member 24 similarly has a predetermined width and may have a deformed portion 28 formed along one of the edges thereof. The width of the metallic strip 24 is preferably sufficient to permit a portion thereof to be uncovered when the elastomeric strip is applied thereto. Each of the strips 22 and 24 are suitably joined to each other by some suitable method such as cementing, or in the preferred embodiment, by bonding in situ during vulcanization of the elastomeric strip.

At the conclusion of the bonding and vulcanization step, a composite strip of elastomeric material backed with metal will result. This strip is then divided into segments of predetermined length as is diagrammatically shown along lines 2—2 in Fig. 1. The segments of the composite strip 20 are then rolled or formed so that the end portions 26 and 27 of the metallic reinforcing member are brought into juxtaposition as is clearly shown in Fig. 2. The deformed portion 28 of the metallic reinforcing member 24 may then be bent at right angles to the elastomeric portion 22 to form a notched flange portion 29 (Fig. 5).

One modification of the annular reinforced article 20 is shown in Figures 6 to 10 of the drawings wherein the deformed portion 30 of the metallic reinforced member 24 comprises a corrugated edge. These corrugations are formed in the metallic edge so as to provide an excess amount of metal for forming an annular flange 34 when the metal of edge portion 30 is stretched and turned to form the flange portion 34 as is clearly seen in Figure 10 of the drawings.

In Figures 11 to 14 of the drawings, another modification of the present invention is shown. In this instance the length of composite strip is divided so the faces 42 thereof are at an angle to the main body of the strip (as in Fig. 14). These angular faces 42 are oriented so as to abut one another when the segment is rolled into annular form.

Thus, it is manifest that the spaced V as shown in the two previous embodiments will be eliminated if the end faces are cut angularly as in this embodiment. A notched edge is provided along the portion 40 of the strip, which is deformed during formation of this strip. This notched edge will result in a continuous serrated flange portion 41 when the strip segments are rolled in a manner previously described wherein the metallic backing member forms the exterior surface of the bushing.

In Figs. 15 to 18 a further modification of the present invention is disclosed. In this instance the end portions 42 of the strip are angularly cut and the edge portion of the metallic reinforcing member are notched as previously described. The elastomeric portion 22 is formed to have a predetermined cross-sectional shape 50 that is reversed when the strip is rolled with the metallic member for forming the exterior surface of the annular article. This reversal of cross-sectional shape of the elastomeric portion of the bushing or seal is accomplished by inwardly deforming as by swaging rolling or spinning the metallic reinforcing member 24. After the swaging is accomplished, the inner surface of the bushing will be cylindrical in shape. In this embodiment the end faces 42 are angularly cut and have portions of the metal removed for providing areas wherein the excess metal may creep when the metallic portions 24 are swaged so as to form a cylindrical surface on the elastomeric member.

Further it is apparent the metallic strip in Fig. 15 may be formed to have the configuration as seen in Fig. 18 and in this instance the elastomeric strip will have a configuration to follow the shape of the metal member so that a straight cylindrical surface 48 may be presented to the interior of the bushing.

Figure 2:
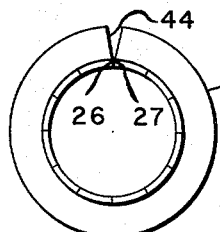
Figure 2 is a view in the direction of arrow 2 in Fig. 1 after the strip has been divided along line 2—2 of Fig. 1 and has been rolled to bring portions of the ends of the strip into juxtaposition.
Figure 1:
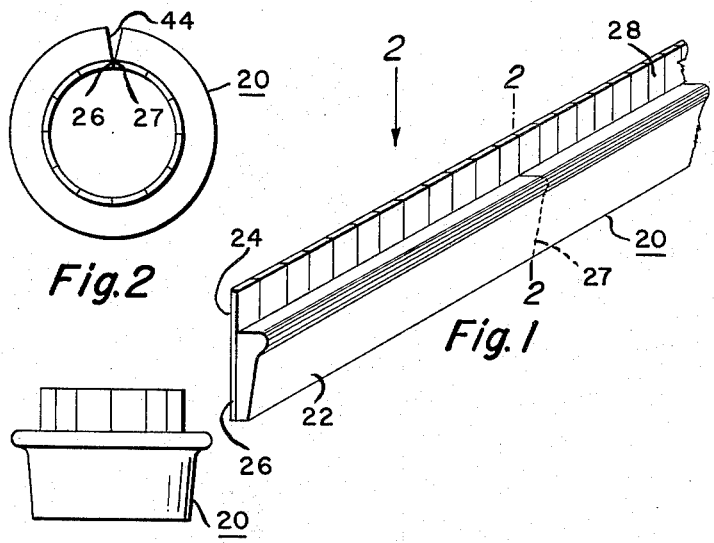
Figure 1 shows in perspective a length of elastomeric strip having a metallic reinforcing member attached thereto.
Figure 4:
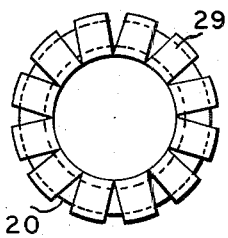
Figure 4 is a top view of the strip shown in Fig. 2 wherein the notched-in-edge as seen in Fig. 1 has been flattened to form a flange.
Figure 3:
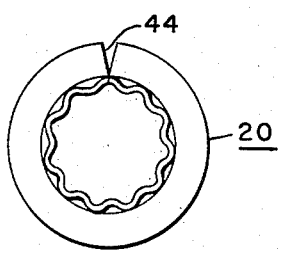
Figure 3 is a side view of the article as seen in Fig. 2.

A still further modification is shown in Figs. 19 to 21 of the drawings wherein portions 52 of the notched elements or alternate notches are partially bent, as shown in Fig. 1 of the drawings, are outwardly deformed. These deformed portions 52 will provide bent tang portions on the serrated flange when the notched portions 28 are bent at the proper angle to the elastomeric member as clearly shown in the drawings. The bent tang portions are shown in the enlarged view in Fig. 20 and may serve as a locking means in subsequent application of the article.

From the foregoing it is apparent that a divided elastomeric bushing or seal formed according to the present invention is adapted for use in a wide variety of installations and may be formed in accordance with the intended use, i. e., the metallic member may be on the inside or outside of the completed bushing, the flange portion may be included, omitted, continuous or serrated or have castellated portions formed therein so as to provide a bearing surface and locking means if desired, and the elastomeric portion may have any desired shape. It is further apparent the deformed portion may be bent by any suitable method as swaging, rolling, spinning at any angle to the elastomeric portion of the strip either before or after the rolling step without affecting the completed article.

The elastomeric portion may be formed of any suitable elastomeric material such as natural or synthetic rubbers including butadiene styrene copolymers, butadiene acrylonitrile copolymers, polychloroprene, etc. mixtures thereof or it may be formed from plastics such as vinyl resins and the like. The material to be used forms no part of this invention and merely requires an elastomer capable of being extruded and bonded to metal.

The method as set forth is particularly adaptable to the formation of a few large diameter bushings wherein the cost of the mold is prohibitive. This cost is largely eliminated in the disclosed method in that a bushing of any size or shape may be economically formed in small production quantities without the use of expensive dies, fixtures, etc.

It is further apparent that the particular form, shape, or size of the bushing or seal is not important to the success of the present invention which is directed to a method of economically forming split annular reinforced elastomeric article suitable for use in a wide variety of applications.

While the embodiment of the present invention as herein disclosed constitutes a preferred form, it is to be understood that other forms might be adopted.

What is claimed is as follows:

1. In a method for forming a split annular elastomeric bushing or seal having a metallic reinforcing member bonded thereto the steps comprising; forming a length of unvulcanized elastomeric strip having a predetermined width and providing a metallic reinforcing strip having a greater width than said elastomeric strip, bringing portions of said strips in contiguous relation with an edge of the metallic strip exposed, heating said elastomeric strip to cure the same while forming a bond in situ with the portions of metallic strip having a contiguous relation with said elastomeric strip for forming a reinforced elastomeric strip, dividing said reinforced strip into sections of predetermined length, bending said exposed edge at right angles to the remainder of said strip for forming a flange, and finally rolling said reinforced strip into a flanged annulus by bringing portions of the ends thereof into juxtaposition.

2. In a method for forming a split elastomeric bushing or seal having a metallic backing forming a reinforcement therefor, the steps comprising; extruding a length of elastomeric strip having a predetermined width and cross sectional shape, providing a metallic strip having a predetermined width and a deformed portion along one edge thereof, placing said strips in contiguous relation so the deformed portion of the metallic strip is uncovered, maintaining said relation between said strips while heating said elastomeric material to cure the same and simultaneously forming a bond between the contiguous portions of the two strips, bending said deformed portion so as to form a longitudinally extending flange, dividing said reinforced strip into sections of predetermined length, and finally rolling each of said sections into an annulus by bringing portions of the ends thereof into juxtaposition for forming a flanged reinforced elastomeric annular article.

3. In a method for forming a reinforced elastomeric bushing or seal as set forth in claim 2 the step for forming corrugated portions in the uncovered portions of the metallic strip for providing a continuous flange on the bushing when said portion is deformed.

4. In a method for forming a reinforced elastomeric bushing or seal as set forth in claim 2 the step for forming notched portions in the uncovered portions of the metallic strip for providing a serrated flange of the bushing when said portion is deformed.

5. In a method for forming a reinforced elastomeric bushing or seal as set forth in claim 2 the step for forming notches having bent portions in the uncovered portions of the metallic strip for providing bent tangs on the flange on the bushing when said portion is deformed.

6. In a method for forming a reinforced elastomeric bushing or seal as set forth in claim 2 the step for forming notched portions in the uncovered portions of the metallic strip for forming a continuous flange on the bushing when the metal portions defining the notches are abutted relative to each other.

7. In the method as set forth in claim 2 wherein the annulus is formed with the metallic strip forming the exterior portion of the bushing.

8. In the method as set forth in claim 2 wherein the annulus is formed with the metallic strip forming the interior portion of said annulus.

9. In a method for forming a split elastomeric bushing or seal having a metallic backing forming a reinforcement therefor the steps comprising; extruding a length of elastomeric strip having a predetermined width and cross-sectional shape with a bead along one edge thereof, providing a metallic strip having a greater width than said elastomeric strip and having opposed castellated portions along the edges thereof, placing said strip in contiguous relation so that one of the castellated portions of said metallic strip is uncovered and the beaded portion of the elastomeric strip is intermediate said castellated edge portions, maintaining said relation between said strips while heating said elastomeric material to cure the same and simultaneously form a bond between the contiguous portions of the two strips, bending said exposed castellated portion over the material of said strip adjacent said beaded portion for forming a longitudinally extending flange, rolling said section of said strips into an annulus by bringing the portions of the ends thereof into juxtaposition, inwardly swedging the covered castellated portions of said metallic strip for reversing the oriented position of said bead for forming a flanged reinforced elastomeric bushing having an inwardly formed exterior metal casing.

References Cited in the file of this patent

UNITED STATES PATENTS

| | | |
|---|---|---|
| 1,492,363 | Edson | Apr. 29, 1924 |
| 1,867,540 | Rosenberg | July 12, 1932 |
| 2,361,139 | White | Oct. 24, 1944 |